United States Patent [19]

Morgan, Jr. et al.

[11] 4,417,450

[45] Nov. 29, 1983

[54] ENERGY MANAGEMENT SYSTEM FOR VENDING MACHINES

[75] Inventors: Annis R. Morgan, Jr.; Eddie W. King, both of Atlanta, Ga.

[73] Assignee: The Coca-Cola Company, Atlanta, Ga.

[21] Appl. No.: 363,961

[22] Filed: Mar. 31, 1982

Related U.S. Application Data

[63] Continuation-in-part of Ser. No. 198,172, Oct. 17, 1980.

[51] Int. Cl.[3] ...................... F25B 49/00; G05D 23/32; F25D 17/06

[52] U.S. Cl. ........................................ 62/126; 62/158; 62/161; 62/180; 62/231

[58] Field of Search ................. 62/157, 158, 231, 161, 62/229, 180, 186, 126, 177, 182

[56] References Cited

U.S. PATENT DOCUMENTS

| | | | |
|---|---|---|---|
| 2,962,872 | 12/1960 | Crotser et al. | 62/155 |
| 3,373,577 | 3/1968 | Bohman | 62/180 |
| 3,747,361 | 7/1973 | Harbour | 62/157 |
| 3,877,243 | 4/1975 | Kramer | 62/180 |
| 4,021,213 | 5/1977 | Neidhardt et al. | 62/180 |
| 4,075,864 | 2/1978 | Schrader | 62/180 |
| 4,094,166 | 6/1978 | Jerles | 62/158 |
| 4,136,730 | 1/1979 | Kinsey | 62/231 |
| 4,358,932 | 11/1982 | Helfrich, Jr. | 62/126 |

FOREIGN PATENT DOCUMENTS 1449823 9/1976 United Kingdom .

*Primary Examiner*—Albert J. Makay
*Assistant Examiner*—Harry Tanner
*Attorney, Agent, or Firm*—Birch, Stewart, Kolasch & Birch

[57] ABSTRACT

An energy management system for a chilled product vending machine for controlling the cycling of the refrigeration system therefor and the ON-OFF status of the machine is described. The energy management system includes a microcomputer for controlling the above-described cycling and ON-OFF functions. A hand-held programmer is provided to input machine ON-OFF times to the microcomputer, the ON times defining sales periods. The microcomputer has data stored therein related to cooling characteristics of different types of machines which may be selectively accessed by manually-actuated selector switches. This enables retrofitting of the energy management system into various types of vending machines. The energy management system also provides increased cooling during high volume sales periods, morning warm-up prior to the beginning of a sales period, periodic continuous cool-downs to maintain acceptable product temperatures, and continuous cool-down following individual vends during a non-sales period. Safety features are also provided in case of microcomputer malfunction or power failures to protect the vending machines.

10 Claims, 7 Drawing Figures

ENERGY MANAGEMENT SYSTEM FOR VENDING MACHINES

BACKGROUND OF THE INVENTION

The present invention is a continuation-in-part of the invention described in application Ser. No. 198,172, filed Oct. 17, 1980, by the same inventors.

The present invention relates to an energy conservation and management system for chilled-product vending machines. More specifically, the present invention relates to a control module for a convection-type refrigeration system for a vending machine which dispenses chilled products such as beverage cans, bottles or cups.

Prior to the invention described in U.S. application Ser. No. 198,172, refrigeration systems of vending machines including a compressor, a condenser, evaporator coil and an evaporator fan, the compressor has been cycled ON and OFF under the control of a thermostat, and the evaporator fan, which blows air over the evaporator coil to circulate chilled air throughout the vending machine, has been run continuously even during the periods when the compressor was OFF. The unnecessary high energy usage and waste caused by the continuous running of the evaporator fan or fans, has become a problem with the current high cost of energy. One logical solution to reducing the consumption of energy is to cycle the evaporator fan motor ON and OFF with the compressor thus decreasing the running time of the evaporator fan. However, this approach causes several problems, the discovery of which are part of the present invention.

Firstly, if the evaporator fan is cycled off in synchronism with the turning OFF of the compressor, freeze up of the evaporator coil can occur in humid, high temperature conditions. Secondly, by keeping the evaporator fan shut off during the compressor off cycles, large variations in temperature in the vending machine occur, creating large variations in temperature of the next to be vended products. Also, during this off period of the evaporator fan, large variations of temperature occur throughout the vending machine due to lack of air flow, and temperatures sensed by the thermostat which controls the compressor cycling are less accurate than desirable. Thirdly, when vending machines are located in below freezing environments (32° F.), an idle condition of the evaporator fan may permit the chilled products to freeze. That is, when the evaporator fan is running and blowing air over the evaporator coil and throughout the vending machine, this flow of air dissipates heat generated by the evaporator fan motors, thus acting as a heater to prevent the stored products from freezing. Thus, the aforementioned problems exist when the evaporator fan is permitted to cycle on and off with the compressor, even though a substantial reduction in energy consumption results.

The system described in the aforementioned application Ser. No. 198,172 solved some of these problems by reducing the consumption of energy in the refrigeration system of vending machines, and at the same time solving the problems of evaporator coil freeze up in high, humid temperature conditions; product freeze up in below-freezing environmental conditions; and large variations in next to be vended products and temperature distribution throughout the vending machine. These functions were performed by electromechanical timers.

A need in the art still exists for a system for performing the above-described functions and additional energy conservation-related functions which can be retrofit into various types of commercially-available vending machines.

SUMMARY OF THE INVENTION

Accordingly, it is a primary object of the present invention to provide a microcomputer energy management module and interface circuitry therefor which enables retrofitting of the module into various types of commercially-available vending machines.

It is a further object of the present invention to provide an energy management system which can be operated in an energy conservation mode for normal vend rate periods and in a stepped-up cooling mode during high demand (vend rate) periods.

It is still a further object of the present invention to provide a portable hand-held programmer module to enable servicemen to perform a limited number of programming functions on the microcomputer of the module in the field.

It is yet another object of the present invention to provide an energy management system with the capability of overriding energy conservation functions for selected periods when the need arises to maintain acceptable temperatures of next to be vended products.

The objects of the present invention are fulfilled by providing a low-cost, solid state microcomputer controller with the capability to retrofit various commercially-available vending machines. The system also can be installed on newly manufactured vendors.

The microcomputer preferably is not programmable to the extent of changing logic, however, start-up programming can be accomplished through a hand-held programmer.

Some major functions of the system are evaporator fan cycling, disabling the refrigeration system during specified hours, disabling the refrigeration system on specified days, and disabling the medallion or illuminated product logo sign whenever required by the time of day and day of week function. These functions are all maintained by the internal clock of the microcomputer.

The energy management system is essentially two component devices; the microcomputer and the hand-held programmer. The microcomputer is installed in a vendor and the programmer is the device to input and retrieve data from the microprocessor. Input data from the programmer is preferably limited to time of day, day of week, manufacturer of vendor, and disabling the refrigeration and medallion light by time of day and day of week programming. The microcomputer is interfaced to the components of the vendor to control the energy management system functions via a vend credit relay, temperature switch, medallion light, evaporator fans, and compressor. By sensing pulses from the vend credit and temperature switch, the routines of the energy management system are initiated. Thus, output to the evaporator fans, compressor, and the medallion lights are controlled.

Air flow characteristics of the major vendor manufacturers are very different. By expanding the evaporator fan delaying process described in parent application Ser. No. 198,172, fan cycling can be done without freeze up of the evaporator coil. Separate techniques of fan delays and cycling were adapted to various commercially-available bottle/can vendors. Time variation of evaporator fan delay and cycling are the major contributors to energy reduction. Also important to vendor operation is that this cycling must now allow the next to be vended drink temperatures to fluctuate out of the acceptable Company standards. The system of the present invention does not allow this out of tolerance fluctuation by providing suitable system overrides.

Temperature fluctuation is effected by vend rate. Sensors interfaced with the vend credit relay can determine sales rates. Should the sales rate exceed a programmed limit, the conservation functions of the system of the present invention would be overridden to assure that product would always be dispensed at the proper temperature. Other override functions include periodic clock-controlled cool down periods and continuous periods of compressor operation following a vend in a non-sales period.

Other features of the system include a battery back-up system to maintain the programmable features during power failure, and a microprocessor failure mode to insure against vendor equipment damage in the event of a microprocessor failure.

Installation of the system on a bottle-can vendor depending on the application results in reduction of energy consumption by 20 to 60%.

BRIEF DESCRIPTION OF THE DRAWINGS

The objects of the present invention and the attendant advantages thereof will become more readily apparent by reference to the accompanying drawings wherein.

GENERAL SYSTEM DESCRIPTION OF OPERATION

Figure 1:
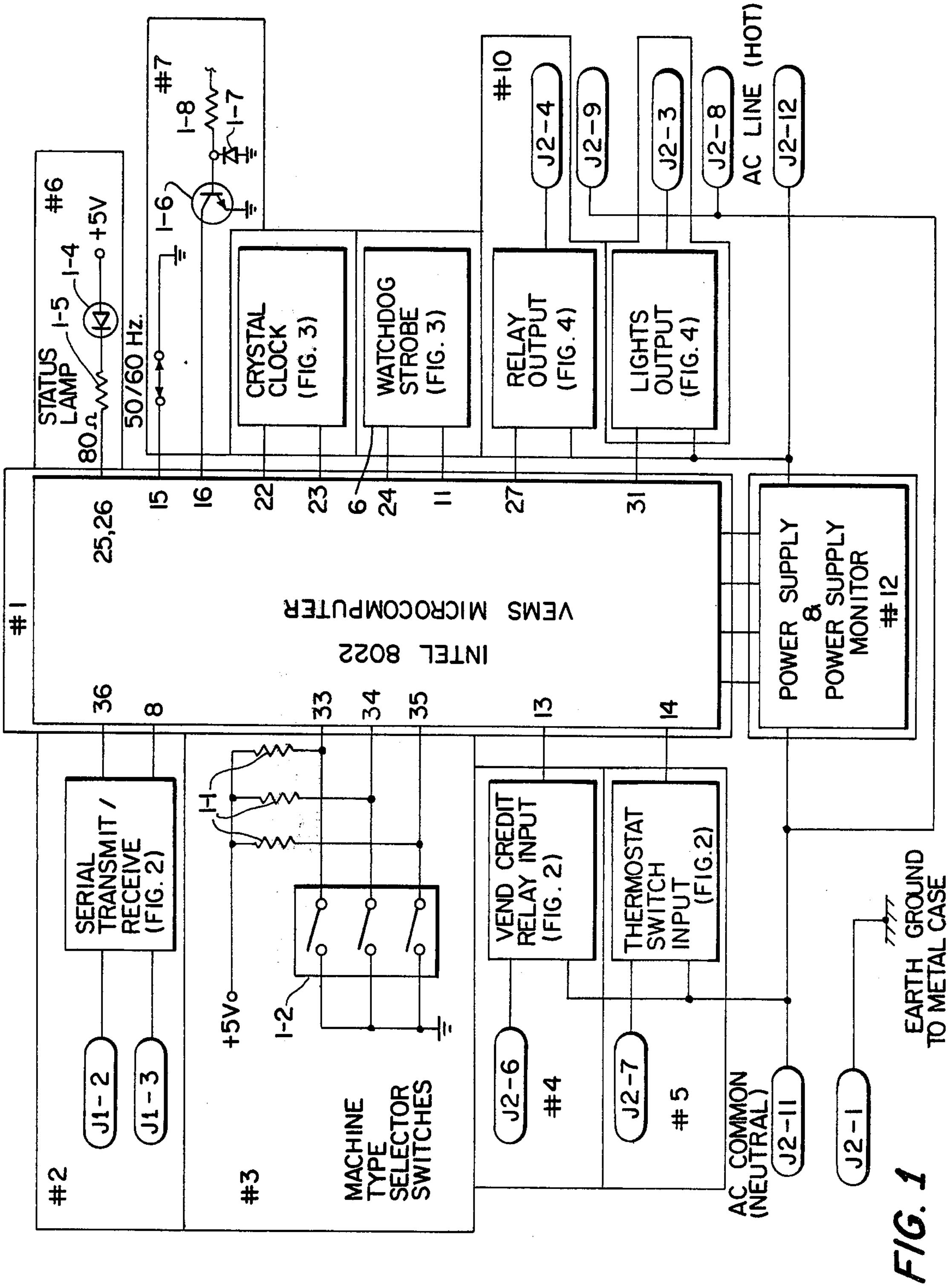
FIG. 1 is a schematic block diagram of the vendor energy management system (VEMS) of the present invention.

The Vendor Energy Management System (VEMS) controls and reduces the energy consumption of a vendor in either of two modes. These modes are a non-programmed (or default) mode and a programmed mode.

Non-Programmed (Default) Mode Operation

The non-programmed (default) mode occurs following power-up (from either AC or an optional battery). No user interface is required for default mode operation. During default mode operation, the refrigeration system is controlled via the contacts of the VEMS relay. (See FIG. 5). The medallion lamps and ballast are switched on continuously via the triac of the lights output circuitry. (See FIG. 4).

The VEMS relay has a 120-volt coil W with two sets of normally closed (NC) contacts A and B. Energization of the VEMS relay coil therefore opens the contacts of the VEMS relay breaking the circuit to the compressor motor and condensor fan motor via N.C. contact A and to the evaporator fan motor(s) via N.C. contact B. (See FIG. 5). Energization of the VEMS relay coil is via the refrigeration relay output circuit of FIG. 4.

Basically, the status of the VEMS relay in the non-programmed mode is such that the relay contacts are closed:

1. When the thermostat switch is closed. (See Detailed Description Block #1, Item G which follows).
2. For a delay period following opening of the thermostat switch (See Detailed Description Block #1, Item H which follows).
3. When the thermostat switch has not closed within 4 hours and continuing until the thermostat switch does close. (See Detailed Description Block #1, Item I which follows).
4. When the fourth vend occurs within any 4-minute period and continuing for 8 minutes. (See Detailed Description Block #1, Item K which follows).
5. For 30 seconds following 5 minutes off in a continuous cycle when none of the above conditions apply. (See Detailed Description Block #1, Item G which follows).
6. Continuously for three cycles of the thermostat switch once each day dependent on machine type switch setting. (See Detailed Description Block #1, Item J which follows).

This default mode operation is indicated by the status lamp flashing with a cycle of 4 seconds on and 1 second off.

II. Programmed Operation

Following programming the medallion lamps are switched on only as per the programmed time-of-day parameters. The refrigeration system is allowed to operate only, except as listed below, as per the programmed sales time schedule. Operation during the programmed sales time is as during default mode operation.

Additionally, the refrigeration system is operative during the programmed non-sale time:

1. Continuously for variable period of time immediately preceding each programmed on time. This time period is termed the "pulldown time" and is dependent on machine type (as per the machine type switch) and the duration of the programmed non-sales period. (See Detailed Description Section #1, Item S).
2. Continuously for three compressor cycles should a vend occur during the programmed non-sales period. (See Detailed Description Section #1, Item T).
3. When the thermostat switch has not closed within 4 hours. (See Detailed Description Section #1, Item I).

Programmed operation of the medallion lamps and/or the refrigeratino system is indicated by status lamp operation of 4 seconds off and 1 second on.

III. Programming

Programming is accomplished by means of a hand-held portable programmer. Programming consists of self-prompting instructional phrases followed by keyed inputs. Additional keys fetch current program parameters and current ~ values. Test keys are included to test the medallion lamp and refrigeration relay outputs.

Status lamp flashing ceases during programming and all outputs are set such that the end device (lamps and refrigeration system) are disabled.

GENERAL DESCRIPTION OF FIG. 1

FIG. 1 shows in block diagram form the subsystems of the Vendor Energy Management System (VEMS) of the present invention. A brief description of the blocks of these subsystems are listed hereinafter. The pin numbers on the microcomputer of block #1 are commercial pin numbers. In addition, the terminal J1-N to J2-N are connected to appropriate terminals in the vending machine control circuit of FIG. 5 to be described hereinafter.

Block #1—VEMS 8022 Microcomputer

The VEMS microcomputer is an Intel 8022 microcomputer with a custom programmed READ-ONLY-Memory (ROM). This memory controls operation of the microcomputer and hence the VEMS module and the vendor refrigeration and lights in accordance with program functions to be described in detail hereinafter.

Block #2—Serial Receive/Transmit

The serial receive/transmit subsystem allows serial communications between the VEMS microcomputer and an external device. In this embodiment, the external device is a Termiflex Corporation's Model CD/20 modified for voltage compatibility and simplified communications.

Block #3—Machine Type Selector Switches

The machine type switches consist of one Dual-in-line (DIP) package with 3 SPST (Single pole single throw) switches and 3 pull-up resistors 1-1. The DIP switch configuration 1-2 is sensed by the VEMS microcomputer. Eight configurations of switch positions are possible with the 3 SPST switches. The microcomputer will change certain parameters of the VEMS program dependent on which one-of-eight switch configurations are sensed.

Block #4—Vent Credit Relay Input

The vent credit relay input senses that a vend credit has been established, electrically isolates and converts the 120 VAC supply signal to microcomputer compatible levels. Vending and rate of vending vary the operation of the VEMS program.

Block #5—Thermostat Switch Input

The thermostat switch input senses thermostat switch closure, isolates and converts this 120 VAC signal to microcomputer compatible voltage levels.

Block #6—Status Lamp

The status lamp is a light-emitting diode (LED) that is externally mounted on the VEMS enclosure. The status lamp flashes to indicate that the VEMS module is operational. When the VEMS module is not programmed, the flashing pattern is 4 seconds ON and 1 second OFF. When programmed, the status lamp flashes 1 second ON and 4 seconds OFF.

Block #7—50/60 Hertz and AC Clock Input

The durational and real-time timekeeping functions of the VEMS module are normally regulated by the AC power frequency. The 50/60 Hertz input is to adjust an internal clock in the microcomputer to receive either 50 or 60 hertz. The AC clock input is sensed via pin 16.

Block #8—Crystal Clock

The crystal clock is used for operation timekeeping, that is, for the overhead functions of the microcomputer (data shift, store, memory refresh, etc.). Additionally, during power outages, when the optional battery is attached the crystal clock will maintain the durational and real-time timekeeping functions.

Block #9—Watchdog/Low Voltage Reset

Watchdog strobes are commonly used in digital electronics to ensure proper operation. The microcomputer outputs a signal at regularly-scheduled intervals, the watchdog circuitry monitors this signal and if the signal does not occur as scheduled, the watchdog will reset the microcomputer. Circuitry to monitor the supply voltage for the microcomputer is included in this subsystem. Should the voltage drop more than 0.2 volts below its normal level, the watchdog strobe will be halted and the microcomputer will be reset.

Block #10—Relay Output

Figure 5:
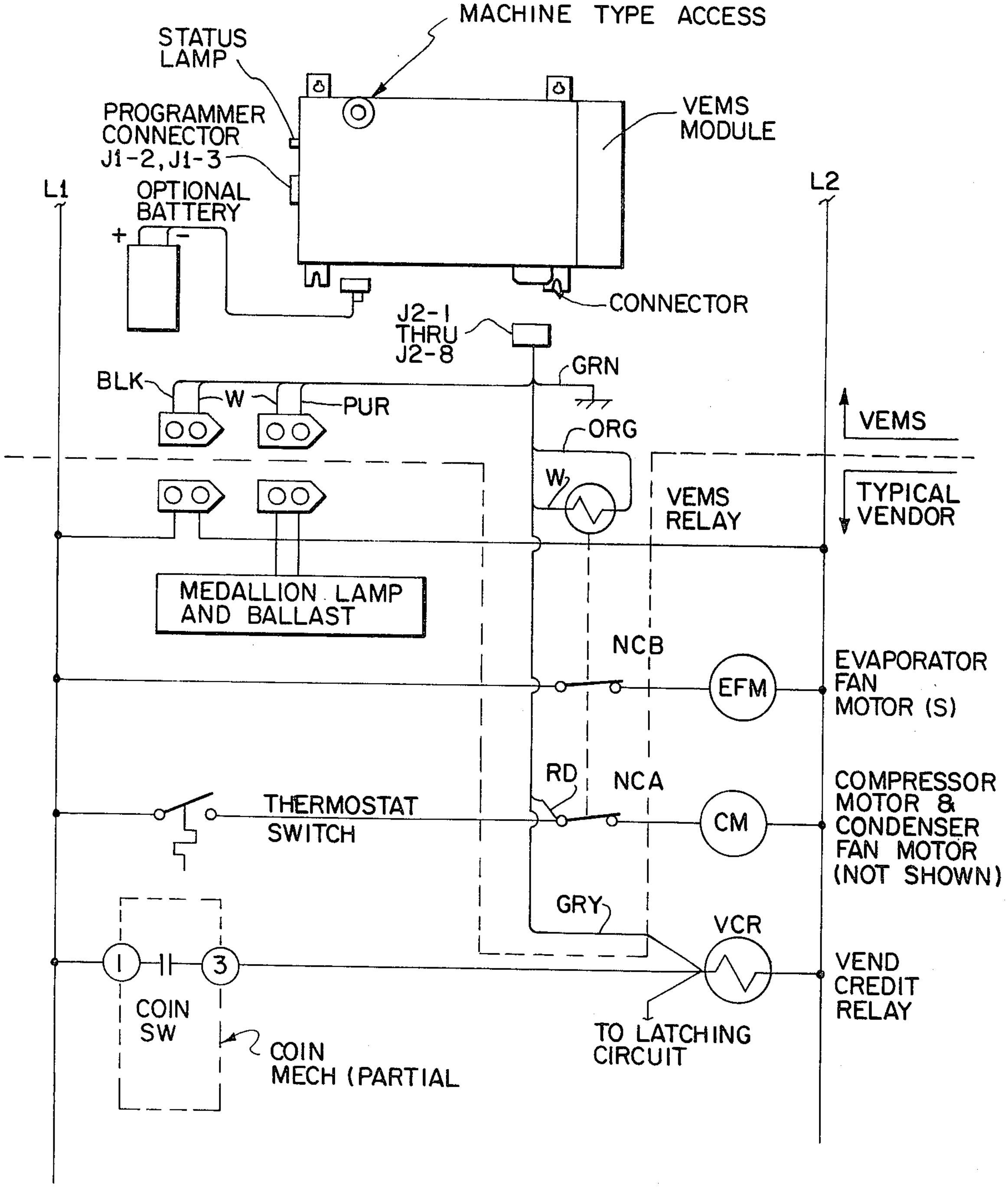
FIG. 5 is a detailed circuit schematic of a typical vending machine control circuit and a general illustration of how it interfaces with the VEMS module of the present invention.

The relay output opens and closes the VEMS relay (see FIG. 5). The contacts of the relay directly drive the evaporator fan motors EFM and are in series with the thermostat switch and the compressor motor. The state (open or close) of the relay contacts is controlled by the VEMS microcomputer #1 and is dependent on the logic of the microcomputer program and the activity of the VEMS inputs (i.e., machine-type switch inputs, vend credit relay input, thermostat switch input, and hand-held programmer parameters).

Block #11—Lights Output

The lights output turns ON and OFF the vendor medallion lights (logo sign panel). The lights are controlled by a triac which switches power to the lamp ballast. The activity of the lights is dependent solely on the time-of-day parameters stored in the microcomputer memory which are input via the hand-held programmer, to be described hereinafter.

Block #12—Power Supply

The power supply subsystem converts 120 VAC to +5 VDC, isolates and protects the VEMS module from external voltage fluctuations and contains battery charging circuitry for the external optional battery.

The VEMS microcomputer monitors the power supply for the AC clock input, the AC available input and the low voltage reset input.

DETAILED DESCRIPTION OF PREFERRED EMBODIMENTS IN CONNECTION WITH FIGS. 1 TO 7

Block #1—VEMS 8022 Microcomputer

The VEMS microcomputer is manufactured by Intel Corporation. The 8022 has 2048 bytes of program memory. The program memory is Read-Only-Memory (ROM) which is mask programmed at the factory with a custom program for performing the functions described hereinafter.

The major routines of the VEMS program within the ROM are as follows:

A. Initialization

Initialization occurs after a hardware reset. A hardware reset is sensed via the microcomputer reset pin (Pin 24), which responds to the watchdog/low voltage reset circuitry of FIG. 3 (low voltage occurs at any power up, as well as during fault conditions).

Initialization causes:

The random Access Memory (RAM) in the microcomputer to be cleared. The RAM is the data storage memory and is used for the hand-held programmer of FIG. 7 entered parameters, the current time, the vend count, etc. (to be described further hereinafter).

The step-up algorithm to begin. (See Item K which follows.)

The default mode to be active. (See Item B which follows.)

B. Default Mode

The default mode is the non-programmable mode. The VEMS module automatically enters the default mode when powered up. The VEMS module remains in the default mode until programmed via the hand-held programmer of FIG. 7. Incomplete or faulty programming will cause the watchdog strobe FIG. 3 to halt resulting in a hardware reset and a return to the default mode.

The default mode causes:

Twenty-four hours per day and 7 days per week operation of the vendor medallion lamps and refrigeration system. Note: the refrigeration system is still controlled in an energy-saving mode (See item Q, which follows).

The status lamp to flash in the non-programmed pattern (4 seconds on and 1 second off).

C. Status Lamp

The status lamp is an externally-mounted LED.

The status lamp flashes with a 5-second period (4 seconds on, 1 second off or 1 second on, 4 seconds off) to indicate normal operation of the VEMS module. The operation of the status lamp is as follows:

The programmed pattern is 1 second on, 4 seconds off.

The non-programmed pattern is 4 seconds on, 1 second off.

A fault due to continuous hardware resets (low DC voltage) causes the status lamp to flash rapidly (approximately 10 times per second).

The status lamp does not flash when the hand-held programmer is attached.

The status lamp may be on or off.

D. Fast Mode

The fast mode is used for testing purposes only. If the VEMS microcomputer fast mode pin (Pin 19) is pulled to ground, the VEMS software causes the duration and real-time timekeeping to operate 50 or 60 times faster (dependent of status of 50/60 Hz pin).

E. Machine Type Switches

The machine type switch is a 3-position Dual-in-Line Package (DIP) switch. The three positions are read by the microcomputer giving eight combinations. The combinations are shown below:

| Switch Positions | | | Machine Type (typical available Vendors) |
|---|---|---|---|
| C | C | C | S1 |
| C | C | O | S2 |
| C | O | C | S3 |
| C | O | O | S4 |
| O | C | C | S5 |
| O | C | O | S6 |

-continued

| Switch Positions | | | Machine Type (typical available Vendors) |
|---|---|---|---|
| O | O | C | S7 |
| O | O | O | S8 |

Note:
C = Closed / O = Opened.

The machine type affects the following VEMS program routines:

Evaporator Fan Delay

The duration of the fan delay is set by the machine type. (See Item H which follows).

Mini-Pulldown

Only certain machine types experience the mini-pulldown routine (see Item J which follows).

Recovery Time

The algorithm to determine the recovery time duration is based on the machine type. (See Item S which follows.)

F. Analog Input

The Analog Input routine monitors the analog input pin (Pin 6) of the microcomputer to check for a minimum output level from the 5 V power supply. Should the supply fall more than approximately 0.25 V out of regulation, the watchdog strobe output is halted which results in a hardware reset. This prevents the VEMS microcomputer from trying to operate in a low-voltage condition as would occur with low AC line voltage or a discharged battery. (See the foregoing General Description of Block #9 Watchdog/Low Voltage Reset).

G. Relay Cycling

During default mode operation and during programmed sales times, the relay cycling routine cycles the VEMS of FIG. 5 such that the relay contacts are closed for 0.5 minutes then opened for 5 minutes in a repeating cycle unless the thermostat switch (FIGS. 1 and 5) is closed, in which case the relay contacts are closed continuously.

H. Relay Delay

Following each compressor cycle (i.e. each opening of the thermostat switch during default and sales time operation), the relay contacts remain closed to allow the evaporator fan(s) to run to ensure that evaporator coil freezing does not occur. The duration of this is dependent on the machine type switch setting (see switch 1-2 of Block #1). The delay time is shown in the following chart.

| Machine Type Switch Setting | VEMS Relay Delay (Minutes) |
|---|---|
| S1 | 4-5 |
| S2 | 4-5 |
| S3 | 4-5 |
| S4 | 4-5 |
| S5 | 4-5 |
| S6 | 6-7 |
| S7 | 10-11 |
| S8 | 255-256 |

Note:
The relay delay timer control pulses from the real-time clock in the microcomputer. Since the real-time clock is not synchronized with the thermostat switch opening, a variation of up to one minute may occur. This is a consequence of software limitations and not a result of intended operations.
Machine type S8 deletes the relay cycling operation since during normal operation a compressor cycle would normally occur prior to timing out of a 255-256 minute delay.
As a convenience on simplifying the software, the delay also follows the step-up routine. (See Item K which follows.)

I. Freeze-Up Protection

The freeze-up protection routine is a safeguard for an abnormal operation. Specifically, in below-freezing ambient environments, the heat generated by the evaporator fans and evaporator fan motors helps to prevent products from freezing.

The freeze-up protection routine turns on the evaporator fan motors if the thermostat switch remains open for more than 4 hours. The freeze-up routine is exited once the thermostat switch closes.

Freeze-up protection operates regardless of the mode of operation (i.e., during default, or programmed-sales periods or non-sales periods.)

J. Mini-Pulldown

Mini-pulldown assures a daily continuous evaporator fan run time for selected machine-type switch settings.

S2
S4
S6
S7
S8

Mini-pulldown causes the relay contacts to be closed continuously for three compressor cycles. Mini-pulldown occurs only for the above-mentioned machine types which do not adequately cool product if only operated in energy conservation modes and only when the programmed non-sales period is less than or equal to two hours or the default mode is active.

Mini-pulldown occurs at 1100 hours as calculated by the internal clock in the microcomputer (in default mode operation this is independent of real-time).

K. Set-Up

The set-up routine increases evaporator fan(s) activity during high sales periods. During programmed sales periods and during default mode operation, the step-up routine causes the relay contacts to close for eight minutes plus the relay delay time whenever four vends occur within any four minute period. The vend rate is sensed by the microcomputer as a function of the rate of energization of the vend credit relay VCR of FIG. 5.

L. Display Data

Figure 7:
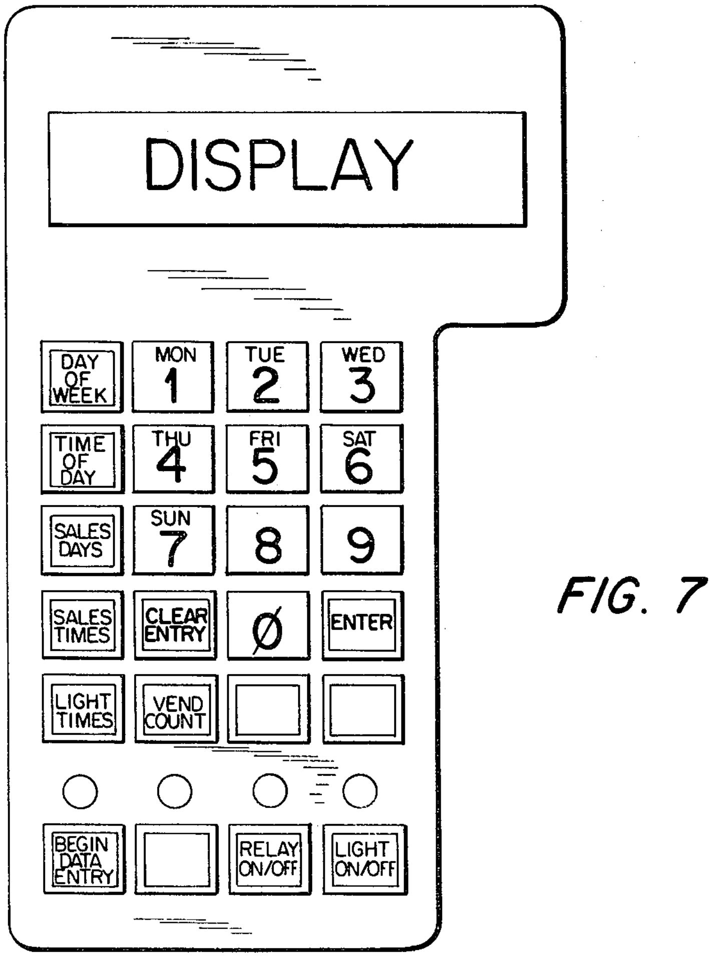
FIG. 7 is a top plan view of a typical keyboard and display of a hand-held programmer suitable for use with the present invention such as a Termiflex CD/20.

By pushing the appropriate button on the hand-held programmer of FIG. 7, the following may be displayed:

Current Day
Current Time
Sales Days
Sales Times
Light Times
Vend Count

While the hand-held programmer is attached, timekeeping functions of the microcomputer cease.

Unplugging the hand-held programmer will force the outputs on. They will stay on until turned off by the software (e.g., relay cycling, scheduled off time).

M. Toggle Outputs

When the hand-held programmer is plugged in, all outputs are turned off.

They may be turned on or off while the hand-held programmer is attached by pushing the appropriate button. The terminal's LEDs indicate the status of the outputs.

When the hand-held programmer is removed, the outputs are forced on. See item P-5.

N. Internal Timekeeping

An internal timer within the microcomputer #1 causes an interrupt approximately every period of the AC line frequency. At that moment the AC line is sampled and the timer is reloaded with the long or the short time, dependent on whether it was early or late, compared to the AC zero crossing. The tracking range is ±4.5%, and timekeeping will be as accurate as the AC line frequency. When AC is not available (that is, when on battery), the unit will operate at 60 Hz within the tolerance of the crystal (±0.02%).

| Line Frequency | Long Time | Short Time | Ticks per Second |
|---|---|---|---|
| 60 Hz | 57.3 Hz | 62.7 Hz | 60 |
| 50 Hz | 47.8 Hz | 52.2 Hz | 50 |
| No AC available | | 60.01 Hz | 60 |

O. Vend Count Accumulation

Actuating the vend relay increments the vend Count, which is stored in a 4-digit BCD register (0–9999).

P. Data Entry Mode

A battery must be attached to the VEMS module to power the hand-held programmer.

While the hand-held programmer is attached, timekeeping functions cease.

The data Entry Mode is initiated by pushing the proper key. The hand-held programmer's LED stays lit until the Data Entry Mode is exited.

Unplugging the hand-held programmer while in the Data Entry Mode halts the Watchdog Strobe. This will cause the Stall Alarm circuit to force a hardware RESET, putting the VEMS module in the Default Mode.

Unplugging the hand-held programmer forces the outputs on. A recovery Period is initiated, which will end at the next scheduled compressor On Time. The lights will stay on until the next scheduled Off Time. The LED will blink the "Programmed" pattern (on 1 sec, off 4 sec).

Q. Relay Output

The relay output routine de-energizes the VEMS relay coil via the relay output circuitry. De-energization of the relay coil causes the N.C. contacts of the relay to close, completing the circuit to the evaporator fan motor(s) and enabling the compressor and condenser fan motors (See FIG. 5.)

The relay output routine monitors various operational routines labeled above as per the following chart.

| Operation Mode | | | |
|---|---|---|---|
| | Programmed | | |
| Default | Sales | Nonsales | Programming |
| ROUTINES | | | |
| G | G | | |
| H | H | | |
| I | I | I | |
| J | J* | | |
| K | K | | |
| | | | M |
| | | S | |
| | | T | |

*Dependent on duration of non-sales period.

R. Light Scheduling

The light scheduling routine turns on the medallion lamps during programmed on time on time in the programmed mode. During default mode operation, the medallion lamps are on continuously.

The medallion lamps remain on immediately following programming until the *next* scheduled off time.

S. Recovery Time

During programmed non-sales periods the refrigeration system is continuously enabled prior to the beginning of the programmed sales period in order to provide time for the product to be adequately chilled at the beginning of the sales period.

The recovery time program calculates this time based on machine-type switch setting (Block #3) and the programmed non-sales period.

The refrigeration system is allowed to run continuously during the recovery time.

The recovery time is computed by a two-slope method. For each hour of programmed non-sales time less than or equal to 7 hours, the recovery time is incremented by the number of minutes in slope 1. For each hour of programmed non-sales greater than 7, the recovery time is incremented by the number of minutes in slope 2.

The recovery time in minutes is the sum of [(non-sales hours $\leqq 7$)$\times$(minutes in slope 1)]+[(non-sales hours $>7$)$\times$(minutes in slope 2)]. The values of slope 1 and slope 2 are shown for all machine-type settings in the following chart.

| Machine Type Switch Setting | Recovery Time | |
|---|---|---|
| | Slope 1 | Slope 2 |
| S1 | 2/ | 1 |
| S2 | 24 | 4 |
| S3 | 35 | 2 |
| S4 | 31 | 4 |
| S5 | 24 | 12 |
| S6 | 24 | 12 |
| S7 | 24 | 10 |
| S8 | 35 | 10 |

T. Override

The override routine will enable the refrigeration system should a vend occur during a programmer non-sales period. The refrigeration system is continuously enabled until the third thermostat opening.

The override routine is active only during programmed non-sales periods and it continually resets with each vend.

Figure 2:
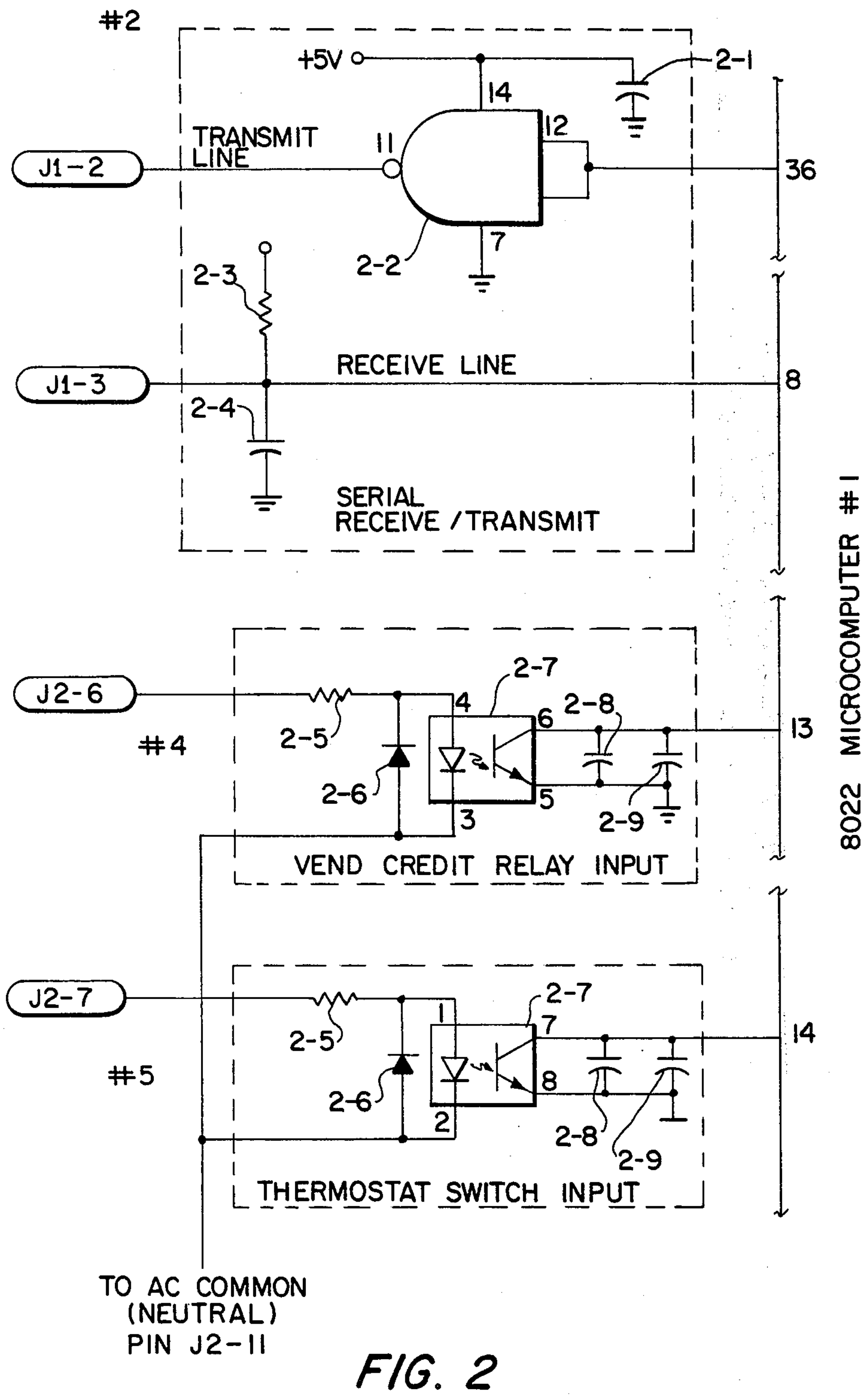
FIG. 2 is a detailed circuit schematic of the functional subsystem blocks #2, #4, and #5 of the system of FIG. 1.

Block #2—Serial Receive/Transmit (FIG. 2)

Serial communications between the VEMS microcomputer and the Termiflex CD/20 hand-held programmer is accomplished via the serial receive/transmit circuitry.

The receive line is connected to VEMS microcomputer input pin 8 and is normally held high by pull-up resistor 2-3. The receive line is switched low by the hand-held programmer. In this manner, communications are received by the VEMS microcomputer.

The transmit line is connected to the VEMS microcomputer output pin 36 via a NAND gate 2-2. The NAND gate 2-2 provides isolation from the VEMS microcomputer and the hand-held programmer.

The hand-held programmer is attached to the VEMS by means of a D type connector externally mounted on the VEMS enclosure. J1-2 and J1-3 indicate the programmer connector pins 2 and 3.

Block #3—Machine Type Switches (FIG. 1)

The configuration of the machine-type switches is sensed by the VEMS microcomputer inputs at pins 33, 34, and 35.

Open switches are held high by pull-up resistors 1-1. If a switch 1-2 is closed, the input will sense the connection to ground.

Block #4—Vend Credit Relay Input (FIG. 2)

Once sufficient money has been accepted by the coin mechanism to establish credit, the Vend Credit Relay (VCR) is energized by the coin mech vend switch. The VCR is latched by vendor wiring such that it remains energized until a vend has been completed.

The vend credit relay input circuitry senses this 120 VAC signal and converts and isolates this signal to microcomputer compatible levels.

When a 120 VAC from the VCR is imposed across connector J2-6 with respect to AC common (Pin J2-11), the photocoupler (2-7) LED is energized, which turns on the photoreceiver; the photoreceiver switches VEMS microcomputer input pin 13 to ground. At all other times pin 13 is held high by an internal pull-up resistor.

Block #5—Thermostat Switch Input (FIG. 2)

Thermostat switch activity is sensed by the thermostat switch input circuitry. When the thermostat switch is closed, the 120 VAC signal is conducted to connector pin J2-7. The thermostat switch input circuitry is identical, in form and function, to the vend credit relay input circuitry.

Block #6—Status Lamp

The status lamp circuitry consists of an LED (1-4) and 180 Ohm resistor (1-5). The microcomputer outputs at pins 25 and 26 switch the status lamp circuitry to ground based on the VEMS algorithm. When the outputs switch to ground, the status lamp is on.

Block #7—AC Clock Input

VEMS microcomputer input pin 16 is connected to transistor 1-6 and diode 1-7. The base of transistor 1-6 is connected to the secondary of the power supply transformer through resistor 1-8. The transistor 1-6 is switched on with each negative cycle from the low voltage AC signal from the transformer secondary. Diode 1-7 ensures that negative cycles are sensed as a low signal by the transistor 1-6 base while positive cycles are sensed high. In this manner, the transistor is switched to ground once each cycle and held high all other times by a microcomputer internal pull-up resistor.

When AC power is available, the real-time clock is incremented by the AC power frequency.

VEMS microcomputer input pin 15 is a 50 or 60 hertz input, whereby the microcomputer software can be changed to allow the real-time clock to be accurately incremented by either a 50 or 60 hertz AC signal.

Note: For domestic use the 50/60 hertz input is hardwired for 60 hertz operation. European versions would be hardwired for 50 hertz operation. Units built for Japan where both 50 and 60 hertz power is available have a DIP switch for field selection.

Figure 3:
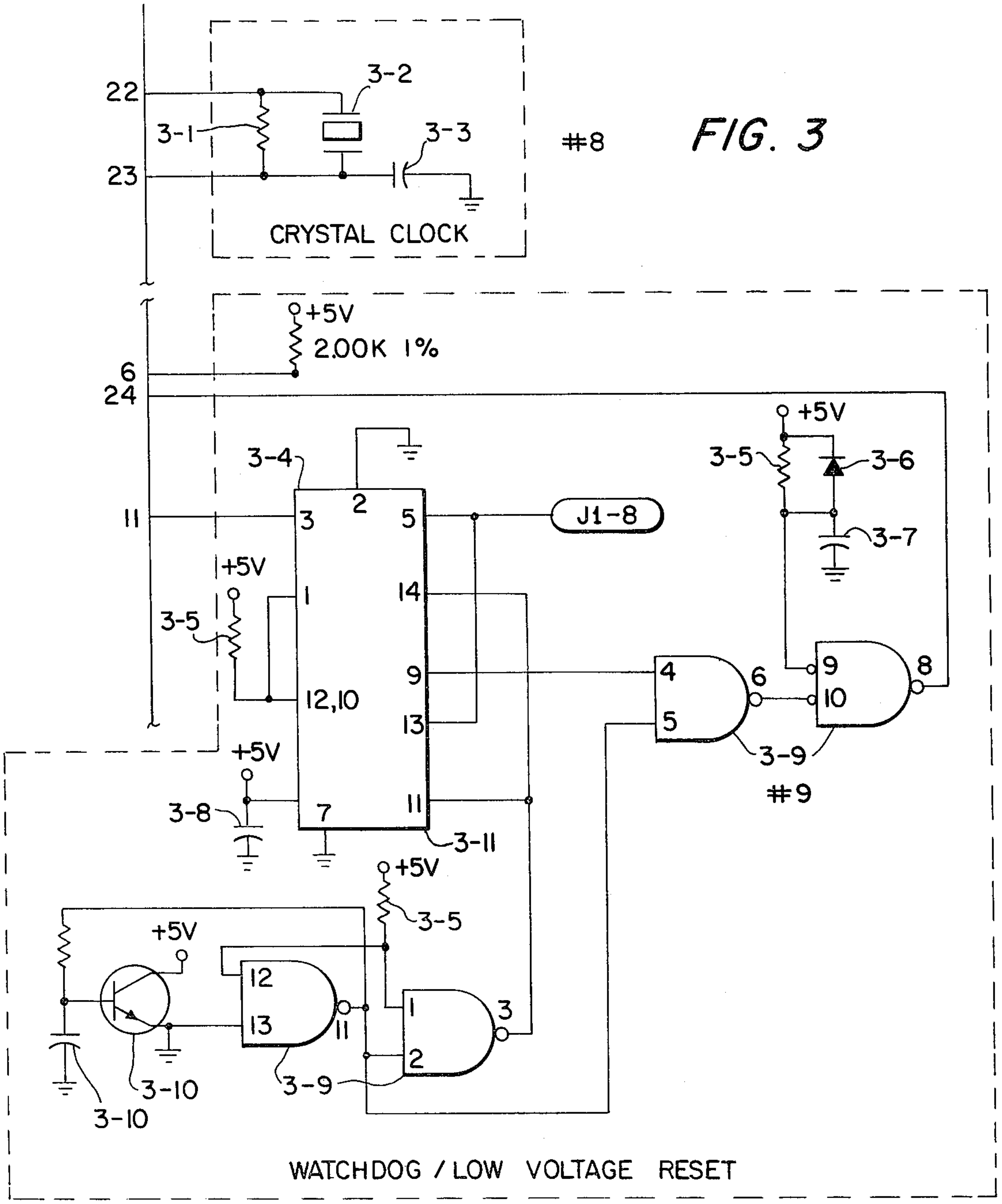
FIG. 3 is a detailed circuit schematic of the functional subsystem blocks #8 and #9 of the system of FIG. 1.

Block #8—Crystl Clock (FIG. 3)

The crystal clock is used as a clock signal for microcomputer operations and as an input signal for the real-time clock if the optional battery is installed and AC power is lost.

The crystal clock operates in a manner well understood in the art.

Piezoelectric crystals are commonly used as clocking devices for electronics. When properly conditioned, piezoelectric provide highly accurate clock signals. In this case, a 3.58 megahertz signal with a +0.02 percent tolerance.

Block #9—Watchdog/Low Voltage Reset (FIG. 3)

Figure 6:
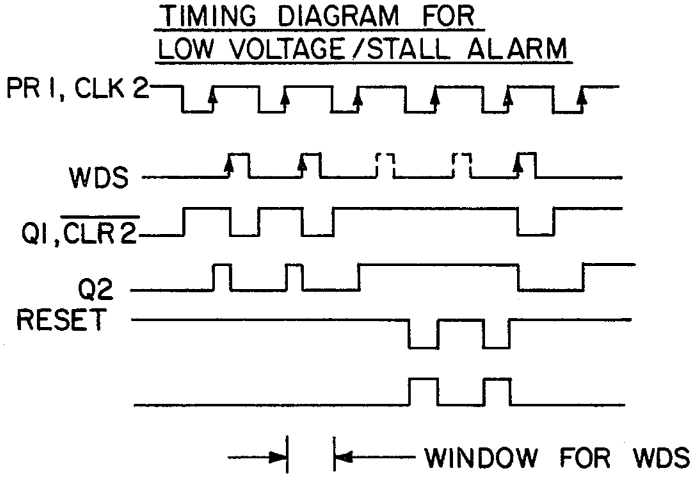
FIG. 6 is a timing diagram explaining the operation of the functional block #9 of FIGS. 1 and 3.

A timing diagram for the minimum requirements of the watchdog/low voltage reset is shown in FIG. 6.

The RC circuit 3-7 is a free-running clock of approximately 10 hertz. This stall alarm signal is conditioned and wave-shaped by two gates (4 and 1) of a quad dual input positive—NAND Schmitt Trigger (74 LS 132).

The watchdog strobe (WDS) signal is output from the VEMS microcomputer (Pin 11) at approximately 100 hertz if:

1. All critical areas of the software have been adequately maintained since the preceding signal. (This is accomplished since flags are set at the exit of each critical routine.)

or if:

2. Analog input O (AN O) indicates that the logic supply voltage has not fallen more than approximately 0.2 V below normal.

The dual D-type-positive-triggered flip-flops (74 LS 74) captures and holds any WDS signal occurring between cycles of the stall alarm signal.

If no WDS signal occurred during a stall alarm clock cycle, then signal Q2 is held high until the WDS returns. If Q2 is held high when the stall alarm clock goes low, the reset is switched low by gate 2 of the 74 LS 74. A low RESET signal or a low signal into pin 9 of gate 3 of the 74 LS 132 will result in a high RESET signal to pin 24 of the VEMS microcomputer. The circuitry attached to pin 9 of the 74 LS 74 acts as a delay during power-up to ensure power-up reset.

When a high signal is present at pin 24, the VEMS microcomputer is cleared and initialized.

Figure 4:
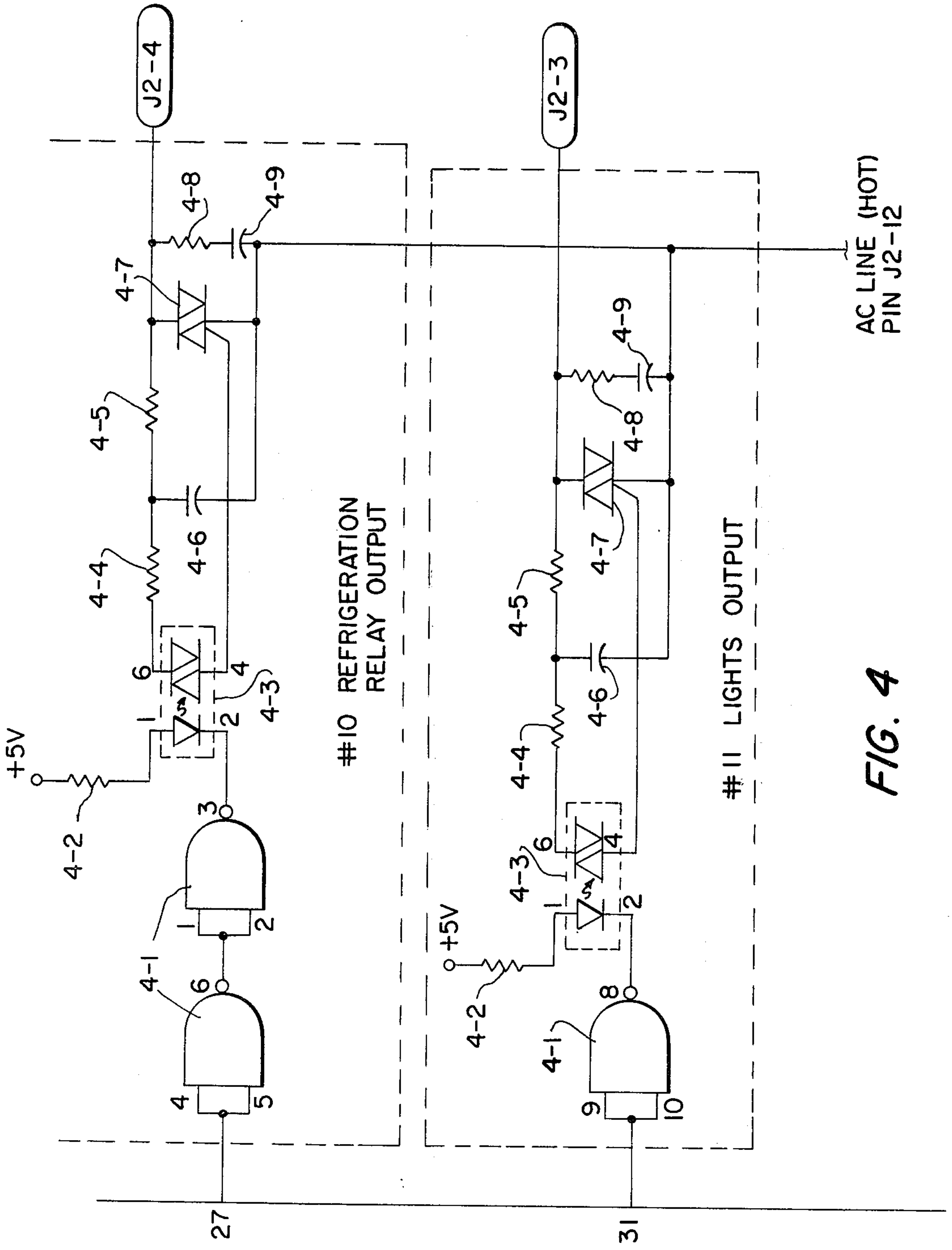
FIG. 4 is a detailed circuit schematic of the functional subsystem blocks #10 and #11 of the system of FIG. 1.

Block #10—Refrigeration Relay Output (FIG. 4)

The refrigeration relay output circuitry operates the VEMS relay (see FIG. 5) under control of the relay output routine. (See Detailed Description Block #1, Item Q).

The VEMS microcomputer output from pin 27 is isolated (and twice inverted) by gates 1 and 2 of the quad 2-input positive NAND buffer (74 LS 38). Pin 3 of the 74 LS 38 then controls triac drive item 4-3 which in turn controls triac item 4-7. The triac switches power to the coil of the VEMS relay.

Block #11—Lights Output (FIG. 4)

The lights output circuitry directly switches power to the medallion lamp ballast based on the light scheduling routine. (See Detailed Description Block #1, Item R).

The lights output circuitry operates in the same manner as the refrigeration output circuitry, except that only one 74 LS 38 is used and thus the VEMS output from pin 31 is inverted once.

Block #12—Power Supply

The power supply converts 120 VAC at 60 hertz to +5 VDC and contains a battery charging circuit for the external optional battery.

It should be understood that the system described herein may be modified as would occur to one of ordinary skill in the art, without departing from the spirit and scope of the present invention.

What is claimed is:

1. In a chilled product vending machine including a refrigeration compressor, temperature sensor means for detecting the temperature within said vending machine and turning said compressor ON and OFF to define a compressor cycle in response to the detection of predetermined temperature limits, an evaporator coil and evaporator fan means for blowing air across said evaporator coil and circulating said air throughout said vending machine, an energy management system comprising:

control means for cycling said evaporator fan means ON simultaneously with said compressor for a time period at least as long as said compressor cycle;

delay means for cycling said evaporator fan means OFF at the end of a predetermined delay period after said compressor is turned OFF, said period of time being long enough to permit the temperature of said evaporator coil to temperature stabilize above the freezing temperature of water;

memory means for storing a plurality of predetermined delay periods of different durations related to cooling characteristics of refrigeration systems of different types of vending machines; and selector switch means for selectively generating coded signals related to the respective different types of vending machines and applying said signals to said memory means for selectively retrieving an appropriate one of said delay periods for implementation by said delay means;

whereby different types of vending machines with different cooling characteristics can be readily retrofitted with said energy management system.

2. In a chilled product vending machine including a refrigeration compressor, temperature sensor means for detecting the temperature within said vending machine and turning said compressor ON and OFF to define a compressor cycle in response to the detection of predetermined temperature limits, an evaporator coil and evaporator fan means for blowing air across said evaporator coil and circulating said air throughout said vending machine, an energy management system comprising:

control means for cycling said evaporator fan means ON simultaneously with said compressor for a time period at least as long as said compressor cycle;

delay means for cycling said evaporator fan means OFF at the end of a predetermined delay period after said compressor is turned OFF, said period of time being long enough to permit the temperature of said evaporator coil to temperature stabilize above the freezing temperature of water;

clock means for measuring increments of time within successive twenty-four hour periods;

memory means for storing time instruction signals for directing said clock means to enable said refrigeration compressor to be controlled by said temperature sensor means only for a sales period of a predetermined duration within each of said twenty-four hour periods, said control means, delay means and cycling means also only being operative during said sales period;

programmer means for inputting said time instruction signals to said memory means to define said sales period;

recovery means for causing said clock means to turn said refrigeration compressor and evaporator fan ON to run continuously for a predetermined recovery period prior to the beginning of said sales period, said recovery period being a function of the duration of said sales period and the cooling characteristics of the refrigeration system of the vending machine;

said memory means further storing a plurality of predetermined recovery periods of different durations related to sales period durations and the cooling characteristics of refrigeration systems of different types of vending machines;

selector switch means for selectively generating coded signals related to the respective different types of vending machines and applying said coded signals to said memory means for selectively retrieving an appropriate one of said recovery periods for implementation by said clock means;

whereby different types of vending machines with different cooling characteristics can be readily retrofitted with said energy management system.

3. The energy management system of claim 2 further comprising:

cycle timer means operative during sid sales period for intermittently cycling said evaporator fan means ON and OFF for predetermined periods between said compressor cycles to thereby maintain an even distribution of chilled air within said machine and minimize temperature fluctuations of the chilled products.

4. The energy management system of claim 1, 2 or 3, wherein said selector switch means comprises a plurality of manually operated switches connected in parallel to said memory means, the collective actuation states of said switches applying a binary coded machine-type identification signal to said memory means.

5. The vending machine and energy management system of claim 2 or 3, further including lighting means for illuminating product-identifying signs on said vending machines, said lighting means being turned on by said clock means only during said sales period.

6. The energy management system of claim 2 or 3, wherein said programmer means comprises an electronic module which plugs into an electrical connector on said memory means.

7. The energy management system of claim 1, 2 or 3, wherein said memory means is a microcomputer.

8. The vending machine and energy management system of claim 2 or 3, further comprising:

vend credit means for sensing the receipt of the proper amount of credit to generate a vend signal to permit the vending of a chilled product from the machine; and override means responsive to the occurrence of a vend signal outside of said sales period to turn said refrigeration compressor and evaporator fan ON to run continuously for a predetermined number of compressor cycles.

9. The vending machine and energy management system of claim 1, 2 or 3, further comprising:

vend credit means for sensing the receipt of the proper amount of credit to generate a vend signal to permit the vending of a chilled product from the machine;

means for detecting the rate of occurrence of said vend signals; and override means responsive to a rate of occurrence of said vend signals above a predetermined limit for turning said refrigeration compressor and evaporator fan ON to run continuously for a predetermined period of time.

10. In a chilled product vending machine including a refrigeration compressor, temperature sensor means for detecting the temperature within said vending machine and turning said compressor ON and OFF to define a compressor cycle in response to the detection of predetermined temperature limits, an evaporator coil and evaporator fan means for blowing air across said evaporator coil and circulating said air throughout said vending machine, an energy management system comprising:

control means for cycling said evaporator fan means ON simultaneously with said compressor for a time period at least as long as said compressor cycle;

delay means for cycling said evaporator fan means OFF at the end of a predetermined delay period after said compressor is turned OFF, said period of time being long enough to permit the temperature of said evaporator coil to temperature stabilize above the freezing temperature of water;

cycle timer means for intermittently cycling said evaporator fan means ON and OFF for predetermined periods between said compressor cycles to thereby maintain an even distribution of chilled air within said machine and minimize temperature fluctuations of the chilled products, clock means for measuring increments of time within successive twenty-four hour periods and generating at least one control signal during each of those periods; and means responsive to said control signal for overriding both said delay means and cycle timer means for a predetermined number of consecutive compressor cycles and constraining said evaporator fan to run continuously for said consecutive compressor cycles.

* * * * *